(12) United States Patent
Shinozaki et al.

(10) Patent No.: US 11,560,935 B2
(45) Date of Patent: Jan. 24, 2023

(54) SPEED REDUCER AND CONSTRUCTION MACHINE

(71) Applicant: Nabtesco Corporation, Tokyo (JP)

(72) Inventors: Takuya Shinozaki, Tokyo (JP); Etsuro Komori, Tokyo (JP)

(73) Assignee: NABTESCO CORPORATION, Tokyo (JP)

( * ) Notice: Subject to any disclaimer, the term of this patent is extended or adjusted under 35 U.S.C. 154(b) by 0 days.

(21) Appl. No.: 17/700,648

(22) Filed: Mar. 22, 2022

(65) Prior Publication Data

US 2022/0316561 A1    Oct. 6, 2022

(30) Foreign Application Priority Data

Mar. 31, 2021 (JP) .............................. JP2021-060407
Sep. 16, 2021 (JP) .............................. JP2021-151168

(51) Int. Cl.
| | |
|---|---|
| *F16H 1/46* | (2006.01) |
| *F16H 57/08* | (2006.01) |
| *F16H 3/66* | (2006.01) |
| *B60K 7/00* | (2006.01) |
| *E02F 9/20* | (2006.01) |

(52) U.S. Cl.
CPC .............. *F16H 1/46* (2013.01); *E02F 9/202* (2013.01); *F16H 3/666* (2013.01); *F16H 57/08* (2013.01); *B60K 2007/0092* (2013.01); *F16H 2200/201* (2013.01)

(58) Field of Classification Search
CPC . F16H 1/46; F16H 57/08; F16H 57/05; F16H 3/666; F16H 2200/201; B60K 2007/0092
See application file for complete search history.

(56) References Cited

U.S. PATENT DOCUMENTS

| | | | |
|---|---|---|---|
| 2019/0285144 A1* | 9/2019 | Yamagishi | ........... B60K 17/046 |
| 2021/0404543 A1* | 12/2021 | Isono | ...................... F16H 48/10 |
| 2022/0024302 A1* | 1/2022 | Jeong | .................. F16H 57/0436 |
| 2022/0034383 A1* | 2/2022 | De Morais | .............. F16H 57/08 |

FOREIGN PATENT DOCUMENTS

| | | |
|---|---|---|
| DE | 102019201887 A1 | 8/2020 |
| JP | 59-26825 B2 | 6/1984 |
| JP | 4-165146 A | 6/1992 |

OTHER PUBLICATIONS

Extended European Search Report dated Aug. 24, 2022, issued in corresponding Application No. 22163326.6 (7 pgs.).

* cited by examiner

*Primary Examiner* — Tinh Dang
(74) *Attorney, Agent, or Firm* — Pillsbury Winthrop Shaw Pittman, LLP

(57) ABSTRACT

Provided is a speed reducer including: a first reduction unit disposed at an input stage of a multi-stage reduction unit that decelerates a rotational driving force of an electric motor from an input stage side toward an output stage side and transmits the decelerated rotational driving force to a rotational drive unit; a first ring gear meshed with first planetary gears provided in the first reduction unit; and a third reduction unit disposed at an output stage of the multi-stage reduction unit and having a first case. The first ring gear is provided in the first case of the third reduction unit.

8 Claims, 4 Drawing Sheets

SPEED REDUCER AND CONSTRUCTION MACHINE

CROSS-REFERENCE TO RELATED APPLICATIONS

This application is based on and claims the benefit of priority from Japanese Patent Application Serial Nos. 2021-060407 (filed on Mar. 31, 2021) and 2021-151168 (filed on Sep. 16, 2021), the contents of which are incorporated herein.

TECHNICAL FIELD

The present disclosure relates to a speed reducer and a construction machine.

BACKGROUND

In an undercarriage of a construction machine (such as an excavator), a pump is driven by an engine as a drive source. The pump controls actuators hydraulically.

In recent years, some methods use a battery as a drive source for driving the pump, in place of an engine as a drive source. For example, in Japanese Patent Application Publication No. Sho 59-26825, it was proposed to use electric motors for electrically driving the actuators on a battery.

When electric motors are used as described above, the power density is lower than with hydraulic motors. Therefore, the electric motors tend to have a larger size than the hydraulic motors. To downsize the electric motors, the power density needs to be increased. To increase the power density, it is necessary that the electric motors rotate at a high speed and the reduction ratio is increased. Therefore, the speed reducer needs to have a multi-stage configuration. However, when the speed reducer has a multi-stage configuration with a planetary multi-stage mechanism of an undercarriage for construction, a ring gear of a front-stage reduction unit is typically fixed to a ring gear of the output stage. Therefore, in conventional speed reducers, unwanted space is present in a connection portion with an electric motor, which causes the electric unit to have a large size. Conventional speed reducers have special parts structure since the ring gear needs to have a large length in the rotational axis direction and a hollow sun gear is needed. Thus, parts of the conventional speed reducers are different for hydraulic motors and for electric motors. This drawback should be overcome.

SUMMARY

The present disclosure provides a speed reducer and a construction machine, in which space in the connection portion with the electric motor is used effectively, so as to enable high speed rotation and downsizing, and in which the same parts can be used as in speed reducers for hydraulic motors.

(1) A speed reducer according to one aspect of the present disclosure comprises: a multi-stage reduction unit for decelerating a rotational driving force of an electric motor from an input stage toward an output stage and transmitting the decelerated rotational driving force to a rotational drive unit, wherein the multi-stage reduction unit includes: a front-stage reduction unit disposed at the input stage and including a first gear; a first ring gear meshed with the first gear; and a final-stage reduction unit disposed at the output stage and including a final-stage carrier having an inner space formed therein, and wherein the first ring gear is disposed in the inner space of the final-stage carrier.

With this configuration, the first ring gear of the front-stage reduction unit at the input stage is provided in the inner space of the final-stage carrier at the output stage. Therefore, the front-stage reduction unit can be disposed in the final-stage carrier on the electric motor side. The space in the final-stage carrier which forms the connection portion with the electric motor conventionally contained the motor shaft only, but this space can be used effectively to contain the front-stage reduction unit. The increase of the size of the speed reducer can be inhibited despite its multi-stage configuration. Accordingly, the reduction unit can be a multi-stage reduction unit having a multi-stage configuration while inhibiting the increase of size of the speed reducer. As a result, for example, the electric motor can rotate at a higher speed with an adequate reduction ratio, increasing the power density. The speed reducer according to this aspect does not need special parts that are conventionally required for an increased length of a ring gear or a modified part shape of the final-stage reduction unit at the output stage. Therefore, the speed reducer can be made of the same parts when used for a hydraulic motor and for an electric motor. There is no need to produce new parts when the speed reducer is used for the electric motor.

(2) It is preferable that the multi-stage reduction unit includes a middle-stage reduction unit interposed between the front-stage reduction unit and the final-stage reduction unit, and the middle-stage reduction unit decelerates the rotational driving force input from the front-stage reduction unit and transmits the decelerated rotational driving force to the final-stage reduction unit.

(3) It is possible that the multi-stage reduction unit includes: a second ring gear meshed with a second gear of the middle-stage reduction unit; and a third ring gear meshed with a third gear of the final-stage reduction unit, and the second ring gear and the third ring gear are not allowed to rotate relative to each other.

(4) It is preferable that in the middle-stage reduction unit includes a second gear and a middle-stage carrier rotatably supporting the second gear, the final-stage reduction unit includes a sun gear and a third gear meshing with the sun gear, the middle-stage carrier is integrated with the sun gear, and the middle-stage carrier and the sun gear are penetrated by an input shaft disposed coaxially with a rotational axis of the electric motor.

(5) It is possible that the final-stage carrier has a bottomed tubular shape with a tubular wall and a bottom wall, the first gear is disposed to mesh with an inner peripheral surface of the tubular wall, the multi-stage reduction unit includes a third ring gear meshed with the third gear, and the bottom wall is provided with: a bearing rotatably supporting the input shaft; and a support column supported so as not to be able to revolve relative to the sun gear and rotatably supporting the third gear.

(6) A speed reducer according to another aspect of the disclosure comprises: a multi-stage reduction unit for decelerating a rotational driving force of an electric motor from an input stage toward an output stage and transmitting the decelerated rotational driving force to a rotational drive unit, wherein the multi-stage reduction unit includes: a front-stage reduction unit disposed at the input stage; a final-stage reduction unit disposed at the output stage and including a final-stage carrier having an inner space formed therein; a middle-stage reduction unit interposed between the front-stage reduction unit and the final-stage reduction unit and configured to decelerate the rotational driving force input from the front-stage reduction unit and transmit the decelerated rotational driving force to the final-stage reduction unit; a first ring gear meshed with a first gear of the front-stage reduction unit; a second ring gear meshed with a second gear of the middle-stage reduction unit, and a third ring gear meshed with a third gear of the final-stage reduction unit and disposed on the second ring gear so as not to be rotatable relative to the second ring gear, wherein the first ring gear is disposed in the inner space of the final-stage carrier, wherein the final-stage reduction unit includes a sun gear, wherein the middle-stage reduction unit includes a middle-stage carrier integrated with the sun gear and rotatably supporting the second gear, wherein the middle-stage carrier and the sun gear are penetrated by an input shaft disposed coaxially with a rotational axis of the electric motor, wherein the final-stage carrier has a bottomed tubular shape with a tubular wall and a bottom wall, wherein the first gear is disposed to mesh with an inner peripheral surface of the tubular wall, and wherein the bottom wall is provided with: a bearing rotatably supporting the input shaft, and a support column supported so as not to be able to revolve relative to the sun gear and rotatably supporting the third gear.

With this configuration, the first ring gear of the front-stage reduction unit at the input stage is provided in the inner space of the final-stage carrier at the output stage. Therefore, the front-stage reduction unit can be disposed in the final-stage carrier on the electric motor side. The space in the final-stage carrier which forms the connection portion with the electric motor conventionally contained the motor shaft only, but this space can be used effectively to contain the front-stage reduction unit. The increase of the size of the speed reducer can be inhibited despite the multi-stage configuration of the reduction unit. Accordingly, the reduction unit can have a multi-stage configuration while inhibiting the increase of size of the speed reducer. As a result, for example, the electric motor can rotate at a higher speed with an adequate reduction ratio, increasing the power density. The speed reducer according to this embodiment does not need special parts that are conventionally required for an increased length of a ring gear or a modified part shape of the final-stage reduction unit at the output stage. Therefore, the speed reducer can be made of the same parts when used for a hydraulic motor and for an electric motor, and thus there is no need to produce new parts. The first ring gear and the front-stage reduction unit can be disposed at an adjacent position on the electric motor side of the final-stage reduction unit. Therefore, the first ring gear can be provided on the final-stage carrier of the final-stage reduction unit. Since the second ring gear and the third ring gear can be provided separate from the first ring gear of the front-stage reduction unit at the input stage, the second ring gear and the third ring gear can be integrated together. Therefore, the structure is not complicated, and the multi-stage reduction unit can be manufactured in simple structure. The sun gear of the final-stage reduction unit is provided on the middle-stage carrier of the middle-stage reduction unit and thus is rotated by the rotational driving force decelerated in the middle-stage reduction unit and transmitted from the middle-stage carrier, not by the rotational driving force of the input shaft. Therefore, the final-stage reduction unit can be interposed between the front-stage reduction unit and the middle-stage reduction unit.

Since the support column provided on the bottom wall of the final-stage carrier supports the third gear so as to be unable to revolve and able to rotate, the third ring gear can be rotated. In this configuration, the bottom wall of the final-stage carrier serves as a final-stage carrier of the final-stage reduction unit, and the tubular wall serves to position the first ring gear. Therefore, the front-stage reduction unit can be efficiently disposed inside the final-stage carrier.

(7) A construction machine according to one aspect of the disclosure comprises: a vehicle body; a drive wheel for traveling of the vehicle body; and an electric motor and a speed reducer for driving the drive wheel, wherein the speed reducer includes a multi-stage reduction unit for decelerating a rotational driving force of an electric motor from an input stage toward an output stage and transmitting the decelerated rotational driving force to a rotational drive unit, wherein the multi-stage reduction unit includes: a front-stage reduction unit disposed at the input stage and including a first gear; a first ring gear meshed with the first gear; a final-stage reduction unit disposed at the output stage and including a final-stage carrier having an inner space formed therein; and a second ring gear meshing with the final-stage reduction unit, wherein the first ring gear is disposed in the inner space of the final-stage carrier and fixed to the vehicle body, wherein the second ring gear is fixed to the drive wheel, and wherein the speed reducer transmits the rotational driving force of the electric motor to the drive wheel.

With this configuration, the space in the final-stage carrier can be used effectively to contain the front-stage reduction unit, and the increase of the size of the speed reducer can be inhibited despite its multi-stage configuration. Accordingly, the reduction unit can have a multi-stage configuration while inhibiting the increase of size of the speed reducer. As a result, for example, the electric motor can rotate at a higher speed with an adequate reduction ratio, increasing the power density. The speed reducer provided with the electric motor can be installed on a construction machine such as an excavator by fixing the final-stage carrier including the first ring gear to the vehicle body and fixing the second ring gear to the drive wheel.

Advantageous Effects

In the speed reducer and the construction machine described above, space in the connection portion with the electric motor is used effectively, so as to enable high speed rotation and downsizing, and the same parts can be used as in speed reducers for hydraulic motors.

DESCRIPTION OF THE EMBODIMENTS

The embodiments of the present disclosure will be hereinafter described with reference to the drawings. In the following embodiments and modifications, like elements will be denoted by the same reference signs and redundant descriptions will be partly omitted.

Figure 1:
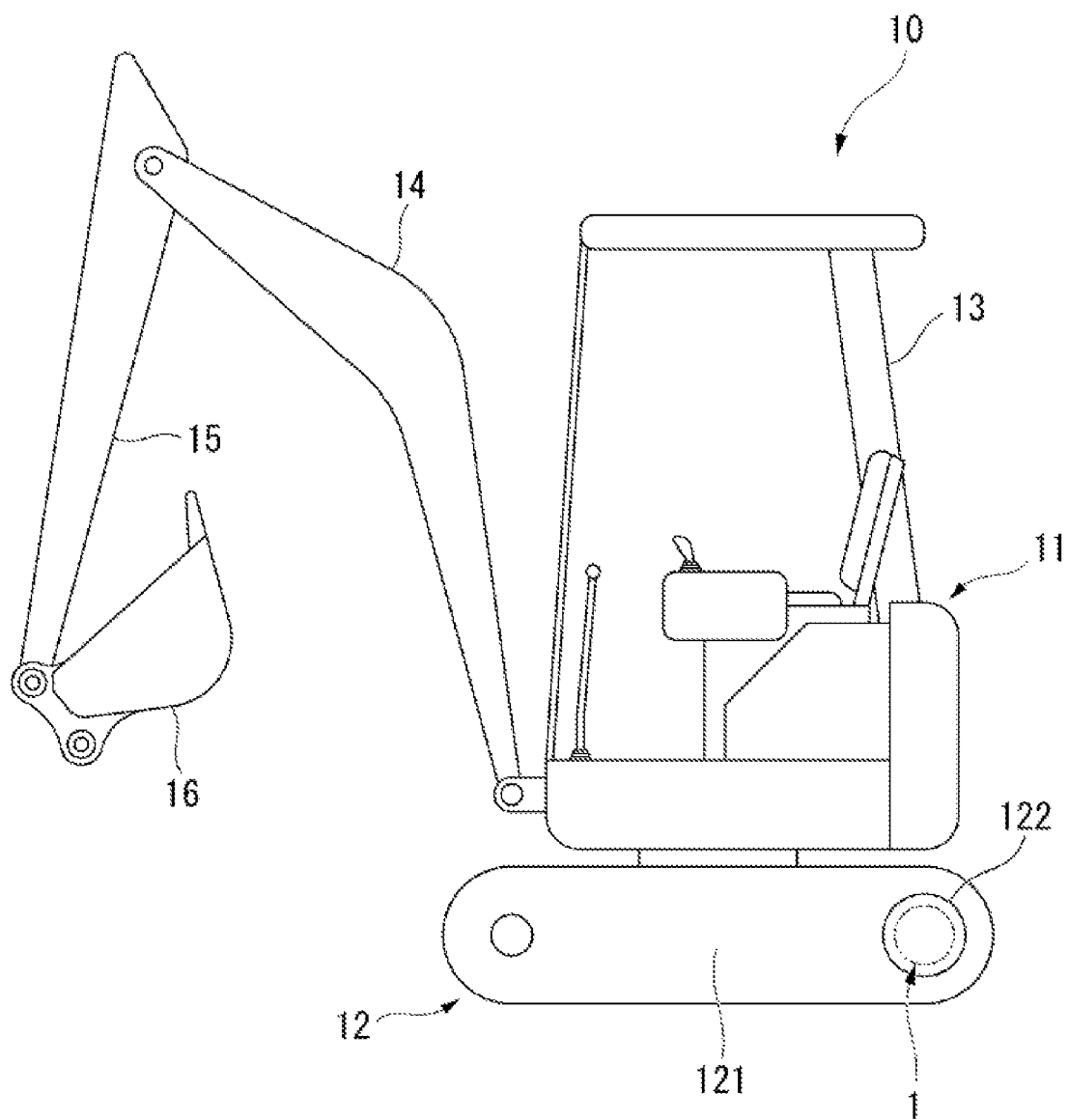
FIG. 1 is a side view of an excavator including a speed reducer according to an embodiment.

FIG. 1 is a side view of an excavator 10 (construction machine) including an electric motor 2 with a speed reducer 1 in a driving unit. The excavator 10 of the embodiment travels by a crawler, which is a form of an undercarriage 12. The excavator 10 includes the undercarriage 12 and a slewable upper structure 11 disposed on the undercarriage 12 so as to be slewable.

The slewable upper structure 11 includes a cab 13, a boom 14, an arm 15, and a bucket 16. The cab 13 houses an operator, the boom 14 has a proximal end portion rotatably supported on the front portion of the cab 13, the arm 15 has a proximal end portion rotatably connected to the distal end portion of the boom 14, and the bucket 16 is rotatably connected to the distal end portion of the arm 15. Joints of the cab 13, the boom 14, the arm 15, and the bucket 16 have drive devices installed therein (not shown). The drive devices in these joints are driven by operation of the operator in the cab 13. The undercarriage 12 includes a crawler body 121 (vehicle body) and a drive wheel 122 rotatably supported on the crawler body 121. The undercarriage 12 includes an electric motor 2 provided with a speed reducer 1 for driving the drive wheel 122.

Figure 2:
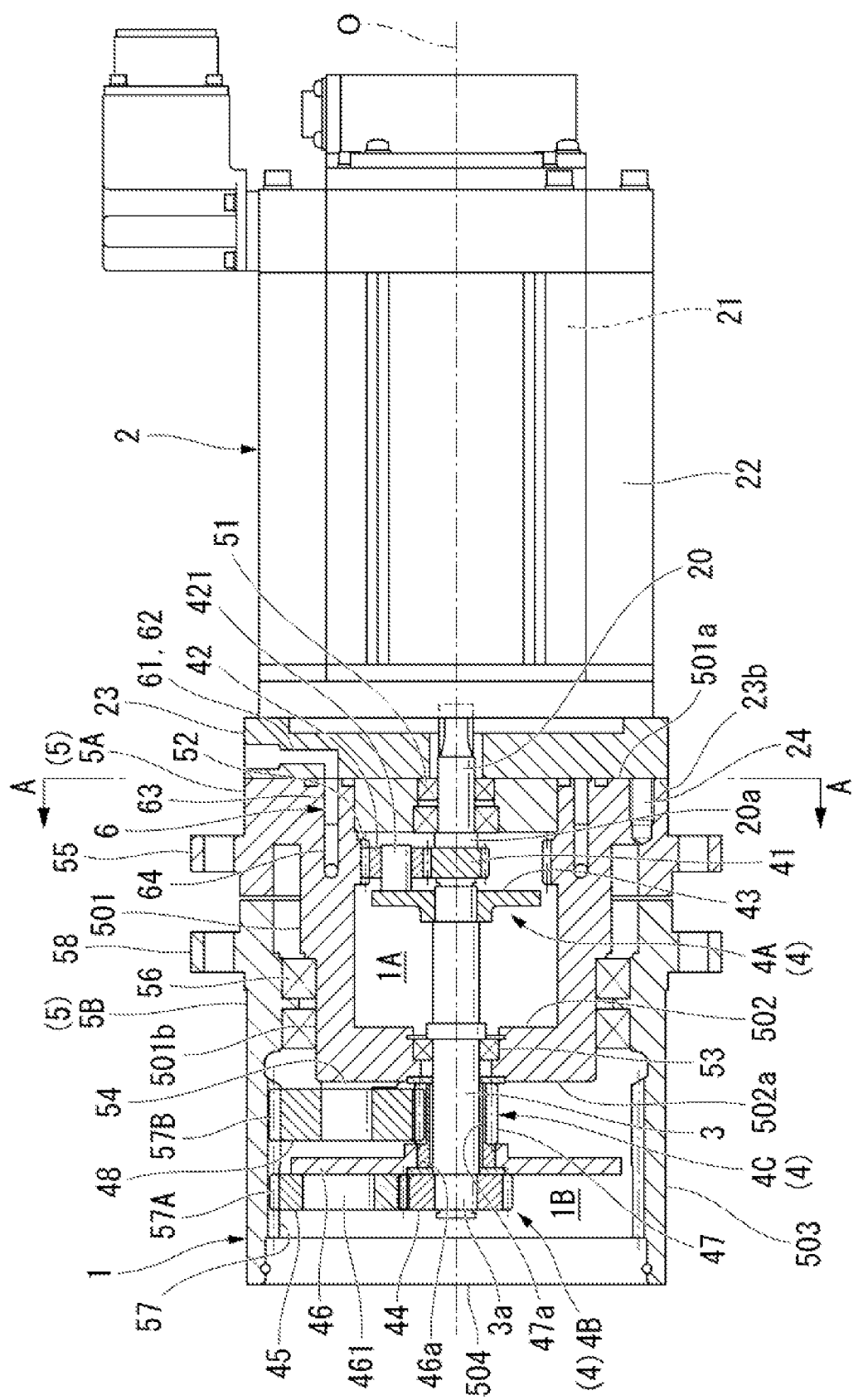
FIG. 2 is a sectional view of the speed reducer with an electric motor according to an embodiment.

FIG. 2 is a sectional view of the speed reducer 1 with the electric motor 2 (cut along a plane including the rotational axis O). The shapes and dimensions of the speed reducer 1 shown in FIG. 2 are examples and do not correspond to actual ones.

The speed reducer 1 is connected to the electric motor 2 that can rotate in both positive and negative directions. The rotational driving force of the electric motor 2 is decelerated at the speed reducer 1 and output as a rotational motion that is then transmitted to an axle provided on the drive wheel 122.

The speed reducer 1 includes three reduction units 4 each formed of a planetary gear mechanism provided between a motor shaft 20 of the electric motor 2 and the axle. In the following description, portions of the speed reducer 1 are referred to as follows. The central axis of the motor shaft 20 is referred to as the rotational axis O, the motor body 21 side in the rotational axis direction is referred to as the input side (input stage), and the side opposite thereto is referred to as the output side (output stage).

The electric motor 2 includes a motor shaft 20, a motor body 21, a motor case 22 retaining the motor body 21, and a motor flange 23 fixed to one end of the motor case 22. The motor shaft 20 extends in the rotational axis direction through the central portion of the motor body 21. The distal end portion 20a of the motor shaft 20 positioned at one end (the left side in the drawing) projects into the speed reducer 1. The electric motor 2 is mounted to the speed reducer 1 via the motor flange 23. The motor flange 23 is shaped like a plate. The motor flange 23 is mounted to the motor case 22 and projects radially outward relative to the motor case 22. The electric motor 2 can be any one of a variety of motors that are driven by power fed thereto, such as so-called brush motors and brushless motors.

The speed reducer 1 includes a multi-stage reduction unit 4 for decelerating the rotational driving force of the electric motor 2 from its input side (input stage) toward its output side (output stage) and transmitting the decelerated rotational driving force to a rotational drive unit. The multi-stage reduction unit 4 is formed of a multi-stage planetary mechanism. The multi-stage reduction unit 4 includes a first reduction unit 4A (front-stage reduction unit) at the first stage, a second reduction unit 4B (middle-stage reduction unit) at the second stage, and a third reduction unit 4C (final-stage reduction unit) at the third stage that are positioned in the order in which the rotational driving force from the motor shaft 20 is transmitted. These reduction units 4 are arranged in the order of the first reduction unit 4A, the third reduction unit 4C, and the second reduction unit 4B from the input side to the output side in the rotational axis direction. That is, the third reduction unit 4C is interposed between the first reduction unit 4A and the second reduction unit 4B. The first reduction unit 4A is rotatably supported by a first case 5A (case 5). The second reduction unit 4B and the third reduction unit 4C share a second case 5B and are rotatably supported by the second case 5B (case 5).

In the embodiment, as shown in FIG. 1, the first case 5A is connected to the crawler body 121. The second case 5B is connected to the drive wheel 122 of the undercarriage 12. The first case 5A and the second case 5B are not necessarily connected in the above-mentioned way to the excavator 10. For example, it is also possible that the first case 5A is connected to the drive wheel 122, and the second case 5B is connected to the crawler body 121. In this configuration, the rotational driving force of the electric motor 2 is transmitted to the undercarriage 12 via the speed reducer 1.

The speed reducer 1 is fixed to an output-side end surface 23b of the motor flange 23 of the electric motor 2 with a fixing bolt 24. Specifically, an end portion of the first case 5A on the input side (an input-side end surface 501a) is mounted to the motor flange 23. The interior of the speed reducer 1 (first speed reducer chamber 1A) is closed in an air-tight manner. The first speed reducer chamber 1A is filled with a lubricant.

The first case 5A has a bottomed tubular shape. The first case 5A includes an inner tubular wall 501 (tubular wall) and a bottom wall 502. The inner tubular wall 501 (tubular wall) is disposed coaxially with the rotational axis, and the bottom wall 502 is opposed to the motor flange 23 and closes an output-side end portion of the inner tubular wall 501. The input-side end surface 501a of the inner tubular wall 501 is fixed to the motor flange 23 with the fixing bolt 24. That is, the first case 5A is integrated with the electric motor 2 so as not to be rotatable relative to the electric motor 2.

In an opening of the inner tubular wall 501 facing toward the input side, a first bearing 51 is provided to rotatably support the motor shaft 20 inserted therethrough. A first ring gear 52 is provided on an input-side portion of the inner peripheral surface of the inner tubular wall 501. The first ring gear 52 is positioned to mesh with a plurality of first planetary gears 42. The inner tubular wall 501 is provided with a first fixing portion 55 to be fixed to the crawler body 121.

On the bottom wall 502 of the first case 5A, there are provided a second bearing 53 and rotational support columns 54 (support columns). The second bearing 53 rotatably supports an input shaft 3 that is formed of a shaft member, and the rotational support columns 54 rotatably support third gears 48 of the third reduction unit 4C. The rotational support columns 54 are provided integrally on an output-side end surface 502a of the bottom wall 502 so as to project in the rotational axis direction.

The second case 5B includes an outer tubular wall 503. The outer tubular wall 503 is fitted on an outer peripheral surface 501b of the inner tubular wall 501 via a third bearing 56 so as to be rotatable in the circumferential direction. A lid 504 is mounted to an opening of the outer tubular wall 503 on the output side (the left side in the drawing). The lid 504 tightly closes a second speed reducer chamber 1B enclosed by the outer tubular wall 503 and the bottom wall 502. The second speed reducer chamber 1B is filled with a lubricant.

An output-stage side ring gear 57 is provided on the inner peripheral surface of the outer tubular wall 503. The output-stage side ring gear 57 is positioned to mesh with both a plurality of second planetary gears 45 and the third gears 48.

In other words, the second case 5B is shared by the second planetary gears 45 and the third gears 48. The second case 5B is a stepped gear. The portion of the output-stage side ring gear 57 meshed with the second planetary gears 45 (second ring gear 57A) has a larger inner diameter than the portion of the output-stage side ring gear 57 meshed with the third gears 48 (third ring gear 57B). The outer tubular wall 503 is provided with a second fixing portion 58 to be fixed to the drive wheel 122 of the excavator 10. The second ring gear 57A and the third ring gear 57B are not allowed to rotate relative to each other.

The input shaft 3 and the rotational support columns 54 are inserted in the second speed reducer chamber 1B. The input shaft 3 penetrates the bottom wall 502 of the first case 5A. The rotational support columns 54 are fixed to the bottom wall 502.

The speed reducer 1 contains the first speed reducer chamber 1A (inner space), which is formed of the space inside the first case 5A, and the second speed reducer chamber 1B, which is formed of the space inside the second case 5B. The firsts speed reducer chamber 1A and the second speed reducer chamber 1B are partitioned by the bottom wall 502 of the first case 5A. The output-side portion of the motor shaft 20 is inserted in the first speed reducer chamber 1A. The distal end portion 20a of the motor shaft 20 is connected with the input shaft 3 positioned coaxially with the motor shaft 20.

The first reduction unit 4A includes a first sun gear 41, a plurality of first planetary gears 42 (first gears), and a first carrier 43 (front-stage carrier). The first sun gear 41 is connected coaxially to the motor shaft 20. The first planetary gears 42 are arranged at regular intervals in the circumferential direction around the first sun gear 41. The first planetary gears 42 are disposed to mesh with the first ring gear 52 of the first case 5A. The first planetary gears 42 are supported rotatably on shaft portions 421 provided on the first carrier 43. That is, the first planetary gears 42 are disposed to mesh with both the first sun gear 41 and the first case 5A.

The shaft portions 421 of the first planetary gears 42 are coupled to the first carrier 43 by press-fitting. The first carrier 43 is shaped like a flat plate ring. The first carrier 43 is positioned on the output side of the first planetary gears 42 in the rotational axis direction and fixed coaxially with the motor shaft 20 so as to be prohibited from rotating relative to the input shaft 3. The connection portion between the motor shaft 20 and the input shaft 3 is positioned between the first sun gear 41 and the first carrier 43.

In the first reduction unit 4A, the rotational driving force of the electric motor 2 is decelerated while being transmitted to the motor shaft 20, the first sun gear 41, the first planetary gears 42, and the first carrier 43. The rotational driving force decelerated in the first reduction unit 4A is transmitted to the input shaft 3 via the first carrier 43.

The second reduction unit 4B includes a second sun gear 44, a plurality of second planetary gears 45 (second gears), and a second carrier 46. The second sun gear 44 is connected coaxially with a distal end portion 3a of the input shaft 3 on the output side (the left side in the drawing). The second planetary gears 45 are arranged at regular intervals in the circumferential direction around the second sun gear 44. The second planetary gears 45 are disposed to mesh with the output-stage side ring gear 57 (second ring gear 57A). The second planetary gears 45 are supported rotatably on shaft portions 461 provided on the second carrier 46. That is, the second planetary gears 45 are disposed to mesh with both the second sun gear 44 and the second case 5B.

The shaft portions 461 of the second planetary gears 45 are coupled to the second carrier 46 by press-fitting. The second carrier 46 is shaped like a flat plate ring. The second carrier 46 is positioned on the input side of the second planetary gears 45 in the rotational axis direction and fixed coaxially with the motor shaft 20 so as to be rotatable relative to the input shaft 3. The second carrier 46 is positioned between the second sun gear 44 and a third sun gear 47 in the rotational axis direction.

In the second reduction unit 4B, the rotational driving force decelerated in the first reduction unit 4A is decelerated while being transmitted through the input shaft 3, the second sun gear 44, the second planetary gears 45, and the second carrier 46. The rotational driving force decelerated in the second reduction unit 4B is transmitted to the third reduction unit 4C (third sun gear 47) via the second carrier 46.

The third reduction unit 4C includes a third sun gear 47 and a plurality of third gears 48 (third gears). The third sun gear 47 has a hollow portion 47a penetrated by the input shaft 3. The input shaft 3 penetrates both the first carrier 43 and the third sun gear 47. The second sun gear 44 is fixed to the distal end portion 3a of the input shaft 3 (the portion across the third sun gear 47) so as to be coaxial with the input shaft 3. The output side of the third sun gear 47 is unrotatably engaged with an inner periphery 46a of the second carrier 46. That is, the third sun gear 47 and the second carrier 46 are integrated together. The third sun gear 47 rotates with the second carrier 46.

The third gears 48 are arranged at regular intervals in the circumferential direction around the third sun gear 47. The third gears 48 are disposed to mesh with the output-stage side ring gear 57 (third ring gear 57B) of the second case 5B. The third gears 48 are supported rotatably by the rotational support columns 54. That is, the third gears 48 are disposed to mesh with both the third sun gear 47 and the second case 5B.

In the third reduction unit 4C, the rotational driving force decelerated in the second reduction unit 4B is decelerated while being transmitted to the third sun gear 47 and the third gears 48. The rotational driving force decelerated in the third reduction unit 4C is transmitted to the second case 5B.

Figure 3:
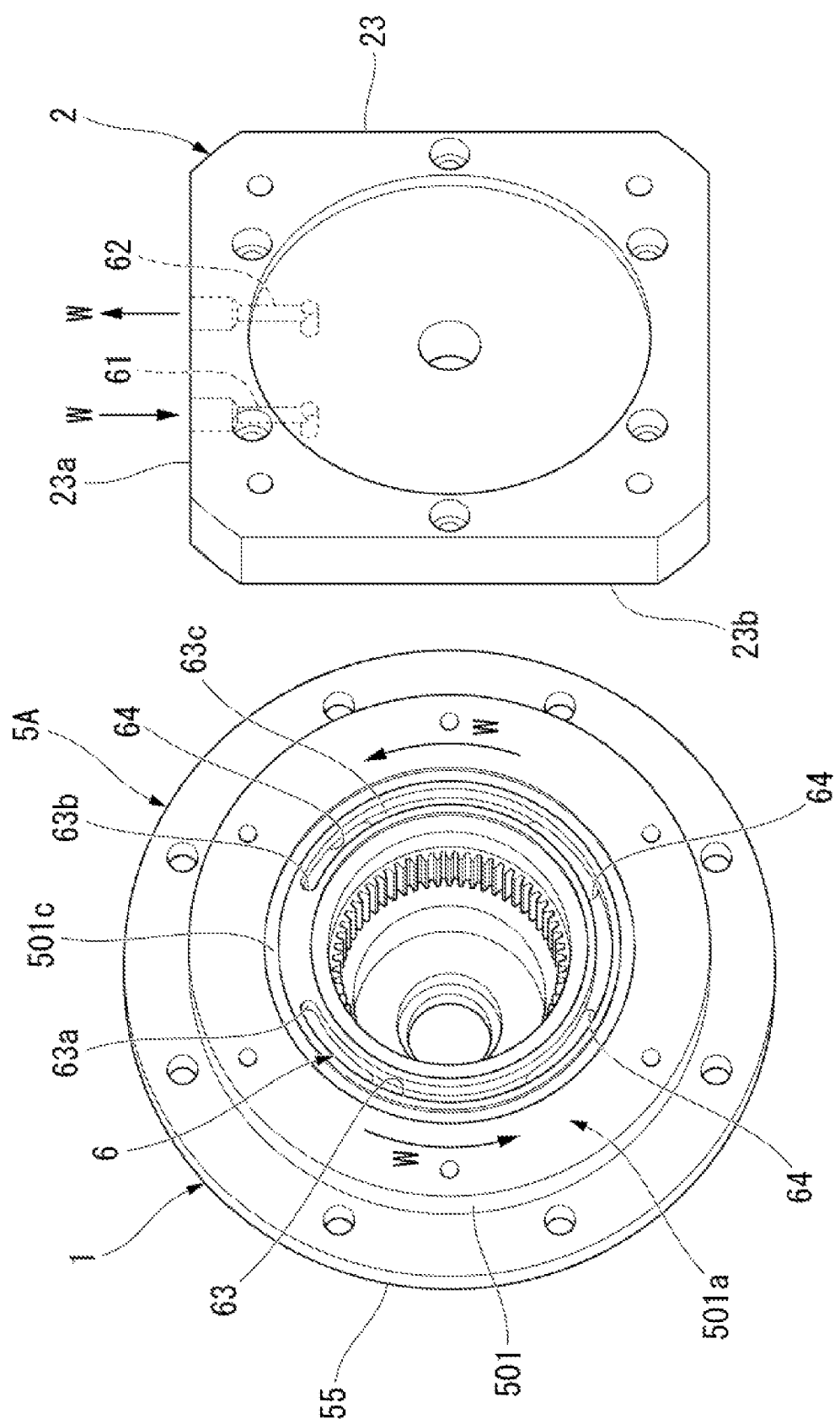
FIG. 3 is a perspective view showing a first ring gear and a motor flange separated from each other.

As shown in FIGS. 2 and 3, the first case 5A is provided with a water-cooling channel 6 for cooling the first reduction unit 4A by water cooling. The motor flange 23 is provided with the inlet port 61 and the outlet port 62 connected to the water-cooling channel 6. The water-cooling channel 6 is disposed in the first case 5A and connected to the inlet port 61 and the outlet port 62.

The inlet port 61 and the outlet port 62 are bent in an L-shape. The inlet port 61 and the outlet port 62 extend from an outer peripheral surface 23a of the motor flange 23 toward the output-side end surface 23b. The inlet port 61 receives cooling water W from the outside into the water-cooling channel 6. The outlet port 62 discharges the cooling water W flowing through the water-cooling channel 6 to the outside. The inlet port 61 and the outlet port 62 are connected by piping to a water supply (not shown) installed on a portion of the excavator 10.

Figure 4:
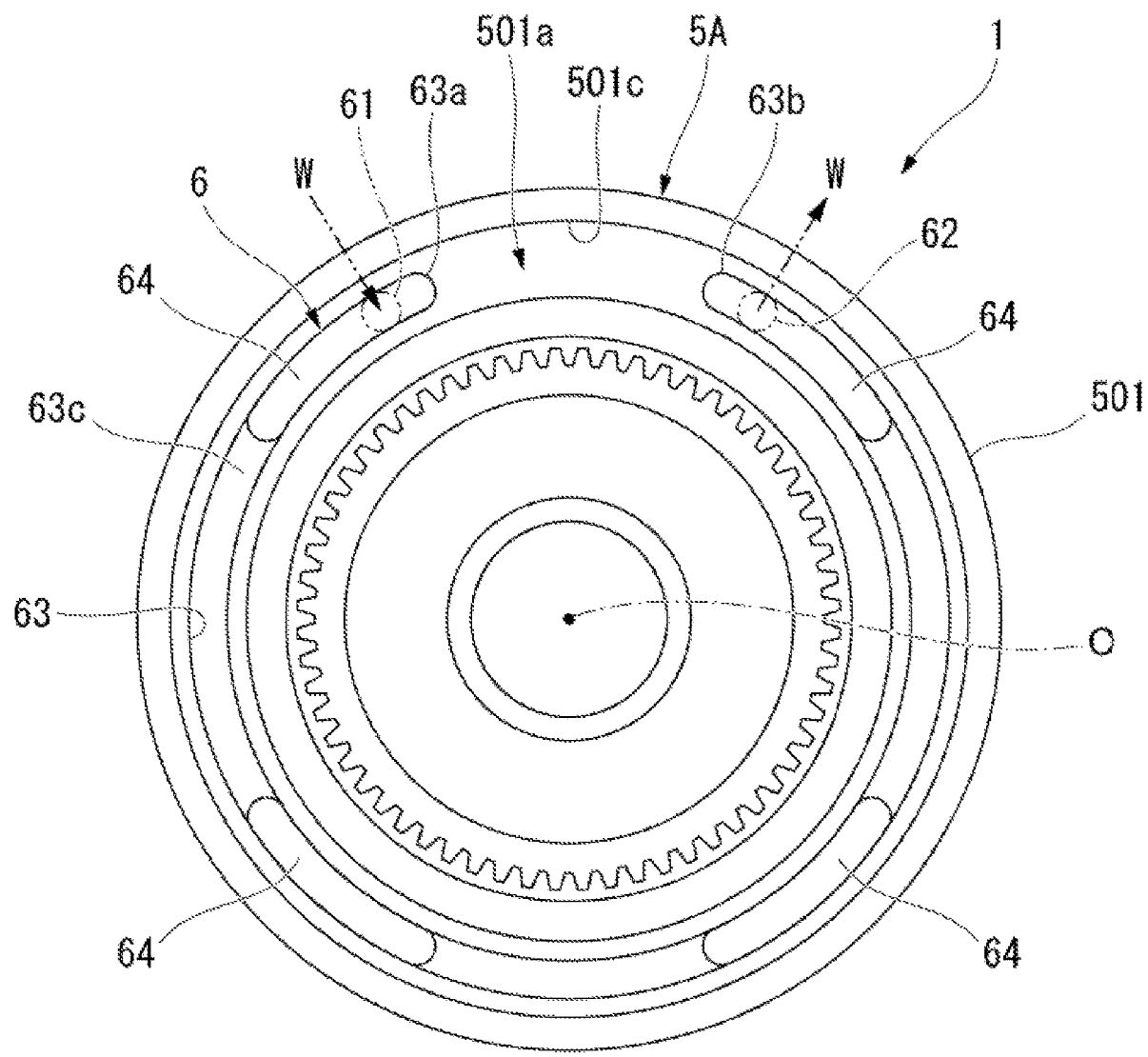
FIG. 4, viewed along the arrows A-A in FIG. 2, is a plan view of the first ring gear viewed from the axial direction.

As shown in FIG. 4, the water-cooling channel 6 is disposed in the input-side end surface 501a of the inner tubular wall 501. On an outer peripheral edge 501c of the inner tubular wall 501 positioned on the outer peripheral side of the water-cooling channel 6 as viewed from the rotational axis direction, a waterproof member (not shown) such as an O-ring is provided so as to be in contact with the motor flange 23 in a liquid tight manner. The water-cooling channel 6 extends in a C-shape as viewed from the rotational axis direction. The water-cooling channel 6 includes a first groove 63 having a small depth and a plurality (four in this embodiment) of second grooves 64 formed in a portion of the first groove 63 and having a larger depth than the first groove 63. In this embodiment, the portion of the input-side end surface 501a in which the water-cooling channel 6 is absent (the portion in which an inlet 63a and an outlet 63b (described later) are positioned) faces upward. However, the portion of the input-side end surface 501a in which the water-cooling channel 6 is absent (the portion in the same circumference as the water-cooling channel 6 but other than the water-cooling channel 6) may face toward any direction. For example, this portion may face downward or laterally.

The second grooves 64 have a larger depth than the bottom portion 63c of the first groove 63 and, as shown in FIG. 2, extend to the vicinity of the first ring gear 52 (the radially outer side of the rotational axis O) in the rotational axis direction. One end portion of the water-cooling channel 6 in the extension direction thereof forms the inlet 63a. The inlet 63a is connected with the inlet port 61. The other end portion of the water-cooling channel 6 in the extension direction thereof forms the outlet 63b. The outlet 63b is connected with the outlet port 62. The cooling water W received through the inlet 63a of the water-cooling channel 6 flows toward the outlet 63b (in the direction of the arrows shown in FIGS. 3 and 4) and is then discharged through the outlet 63b. At this time, the cooling water W flowing into the first groove 63 enters the four second grooves 64.

As shown in FIG. 2, the speed reducer 1 receives a rotational driving force input from the motor shaft 20 rotated by the electric motor 2, and the rotational driving force causes the first planetary gears 42 to rotate while revolving around the rotational axis O, in accordance with the differences in the number of teeth between the first sun gear 41 and the first planetary gears 42 and between the first planetary gears 42 and the first ring gear 52 of the first case 5A, in the first reduction unit 4A. The decelerated rotational driving force is transmitted from the first reduction unit 4A to the input shaft 3 through the first carrier 43 supporting the first planetary gears 42.

When the rotational driving force is input from the first reduction unit 4A to the input shaft 3, the second planetary gears 45 rotate while revolving around the rotational axis O, in accordance with the differences in the number of teeth between the second sun gear 44 and the second planetary gears 45 and between the second planetary gears 45 and the second ring gear 57A of the second case 5B, in the second reduction unit 4B fixed to the distal end portion 3a of the input shaft 3. The decelerated rotational driving force is transmitted from the second reduction unit 4B to the third sun gear 47 of the third reduction unit 4C through the second carrier 46 supporting the second planetary gears 45.

When the rotational driving force is input from the second carrier 46 of the second reduction unit 4B to the third sun gear 47 of the third reduction unit 4C, the third gears 48 rotate and the second case 5B meshing with the third gears 48 rotate around the rotational axis O, in accordance with the differences in the number of teeth between the third sun gear 47 and the third gears 48 and between the third gears 48 and the third ring gear 57B of the second case 5B, in the third reduction unit 4C. That is, the rotational driving force decelerated in the third reduction unit 4C is transmitted to the second case 5B. The rotational driving force transmitted to the second case 5B is output to the drive wheel 122 via the second fixing portion 58.

As described above, the speed reducer 1 of the embodiment includes: the first reduction unit 4A (front-stage reduction unit) disposed at the input stage of the multi-stage reduction unit 4 that decelerates the rotational driving force of the electric motor 2 from the input stage toward the output stage and transmits the decelerated rotational driving force to the rotational drive unit; the first ring gear 52 meshed with the first planetary gears 42 (first gears) provided in the first reduction unit 4A; and the third reduction unit 4C (final-stage reduction unit) disposed at the output stage of the multi-stage reduction unit 4 and having the first case 5A (final-stage carrier). The first ring gear 52 is provided in the first case 5A of the third reduction unit 4C. Thus, the first ring gear 52 of the first reduction unit 4A at the input stage is provided in the first case 5A corresponding to the final-stage carrier at the output stage. Therefore, the first reduction unit 4A can be disposed in the first case 5A on the electric motor 2 side. The space in the first case 5A which forms the connection portion with the electric motor 2 conventionally contained the motor shaft 20 only, but this space can be used effectively to contain the first reduction unit 4A. The increase of the size of the speed reducer 1 can be inhibited despite its multi-stage configuration. Accordingly, the reduction unit 4 can have a multi-stage configuration while inhibiting the increase of size of the speed reducer. As a result, the electric motor 2 can rotate at a higher speed with an adequate reduction ratio, increasing the power density. The speed reducer 1 of the embodiment does not need special parts that are conventionally required for an increased length of a ring gear (corresponding to the first case 5A) or a modified part shape of the third reduction unit 4C at the output stage. Therefore, the speed reducer 1 can be made of the same parts when used for a hydraulic motor and for an electric motor 2. There is no need to produce new parts when the speed reducer 1 is used for the electric motor 2.

In the speed reducer 1 of the embodiment, the rotational driving force input from the first reduction unit 4A (front-stage reduction unit) is decelerated in the second reduction unit 4B (middle-stage reduction unit) interposed between the first reduction unit 4A and the third reduction unit 4C (final-stage reduction unit), and the decelerated rotational driving force is transmitted to the third reduction unit 4C. The third reduction unit 4C is interposed between the first reduction unit 4A and the second reduction unit 4B. Thus, the first ring gear 52 and the first reduction unit 4A can be disposed at an adjacent position on the electric motor 2 side of the third reduction unit 4C as the final-stage reduction unit. Therefore, the first ring gear 52 can be provided on the final-stage carrier (first case 5A) of the third reduction unit 4C.

In the speed reducer 1 of the embodiment, the second planetary gears 45 (second gears) of the second reduction unit 4B (middle-stage reduction unit) mesh with the second ring gear 57A, and the third gears 48 (third gears) of the third reduction unit 4C (final-stage reduction unit) mesh with the third ring gear 57B. The second ring gear 57A and the third ring gear 57B are not allowed to rotate relative to each other. Thus, the second ring gear 57A and the third ring gear 57B can be provided separate from the first ring gear 52 of the first reduction unit 4A at the input stage, and the second ring gear 57A and the third ring gear 57B can be integrated together. Therefore, the structure is not complicated, and the multi-stage reduction unit 4 can be manufactured in simple structure.

In the speed reducer 1 of the embodiment, the second reduction unit 4B (middle-stage reduction unit) includes the second gears and the second carrier 46 (middle-stage carrier) that rotatably supports the second planetary gears 45. The third reduction unit 4C (final-stage reduction unit) includes the third sun gear 47 and the third gears 48 meshing with the third sun gear 47. The third sun gear 47 has the hollow portion 47a penetrated by the input shaft 3 that is coaxial with the motor shaft 20 (rotating shaft). The second carrier 46 is integrated with the third sun gear 47. The input shaft 3 penetrates the second carrier 46 and the third sun gear 47. Therefore, the third sun gear 47 of the third reduction unit 4C is provided on the second carrier 46 of the second reduction unit 4B. Thus, the third sun gear 47 is rotated by the rotational driving force decelerated in the second reduction unit 4B and transmitted from the second carrier 46, not by the rotational driving force of the input shaft 3. Therefore, the third reduction unit 4C can be interposed between the first reduction unit 4A and the second reduction unit 4B.

In the speed reducer 1 of the embodiment, the first case 5A (final-stage carrier) has a bottomed tubular shape with the inner tubular wall 501 (tubular wall) and the bottom wall 502. The inner tubular wall 501 has an inner peripheral surface with which the first planetary gears 42 are meshed. The speed reducer 1 includes the third ring gear 57B meshed with the third gears 48 (third gears). On the bottom wall 502, there are provided the second bearing 53 and rotational support columns 54 (support columns). The second bearing 53 rotatably supports the input shaft 3. The rotational support columns 54 are supported so as not to be able to revolve relative to the third sun gear 47, and rotatably support the third gears 48. Thus, the rotational support columns 54 provided on the bottom wall 502 of the first case 5A support the third gears 48 so as to be unable to revolve and able to rotate, and the rotation of the third gears 48 can cause the rotation of the third ring gear 57B. In this configuration, the bottom wall 502 of the first case 5A serves as a carrier of the third reduction unit 4C (final-stage carrier), and the inner tubular wall 501 serves to position the first ring gear 52. Therefore, the first reduction unit 4A can be efficiently positioned on the inner side of the first case 5A.

The excavator 10 of the embodiment includes the crawler body 121 (vehicle body), the drive wheel 122 for traveling of the crawler body 121, and the electric motor 2 and the speed reducer 1 for driving the drive wheel 122. The speed reducer 1 includes: the first reduction unit 4A (front-stage reduction unit) disposed at the input stage of the multi-stage reduction unit 4 that decelerates the rotational driving force of the electric motor 2 from the input stage side toward the output stage side and transmits the decelerated rotational driving force to the rotational drive unit; the first ring gear 52 meshed with the first planetary gears 42 provided in the first reduction unit 4A; and the third reduction unit 4C (final-stage reduction unit) disposed at the output stage of the multi-stage reduction unit 4 and having the first case 5A (final-stage carrier). The first ring gear 52 is provided in the first case 5A of the third reduction unit 4C. The first ring gear 52 is fixed to the crawler body 121. The second ring gear 57A is fixed to the drive wheel 122. The rotational driving force of the electric motor 2 is transmitted to the drive wheel 122 via the speed reducer 1. Therefore, the space in the first case 5A can be used effectively to contain the first reduction unit 4A, and the increase of the size of the speed reducer 1 can be inhibited despite its multi-stage configuration. Accordingly, the reduction unit 4 can have a multi-stage configuration while inhibiting the increase of size of the speed reducer 1. As a result, the electric motor 2 can rotate at a higher speed with an adequate reduction ratio, increasing the power density. The speed reducer 1 provided with the electric motor 2 can be installed on a construction machine such as the excavator 10 by fixing the first case 5A including the first ring gear 52 to the crawler body 121 and fixing the second ring gear 57A to the drive wheel 122.

The present disclosure is not limited to the above-described embodiments and can be modified in a variety of designs without deviating from the spirit of the present disclosure. For example, in the above embodiments, the second case 5B is disposed on the output side of the first case 5A in the rotational axis direction, and the second case 5B is rotatably supported on the first case 5A, but this configuration with the second case 5B is not limitative.

In the above embodiments, the multi-stage reduction unit 4 has three-stage configuration including the first reduction unit 4A, the second reduction unit 4B, and the third reduction unit 4C, but this three-stage configuration is not limitative. The reduction unit may have two stages or more than three stages.

The speed reducer 1 of the embodiment is formed of the planetary gear mechanism as an example, but the speed reducer 1 is not necessarily formed of the planetary gear mechanism.

In the embodiment, the transmission mechanism is based on speed reducing relationship (speed reducer), but the speed may be maintained or increased.

In the above embodiment, it was described that the speed reducer 1 is applied to the excavator 10, but this is not limitative. The speed reducer of the present disclosure can be applied to construction machines other than excavators.

In the embodiments disclosed herein, a member formed of multiple components may be integrated into a single component, or conversely, a member formed of a single component may be divided into multiple components. Irrespective of whether or not the components are integrated, they are acceptable as long as they are configured to attain the object of the invention.

LIST OF REFERENCE NUMBERS 1 speed reducer
2 electric motor
3 input shaft
4 multi-stage reduction unit
4A first reduction unit (front-stage reduction unit)
4B second reduction unit (middle-stage reduction unit)
4C third reduction unit (final-stage reduction unit)
5 case
5A first case (final-stage carrier)
5B second case
10 excavator (construction machine)
12 undercarriage
41 first sun gear
42 first planetary gear (first gear)
43 first carrier
44 second sun gear
45 second planetary gear (second gear)
46 second carrier
47 third sun gear
48 third gear (third gear)
52 first ring gear
53 bearing
54 rotational support column (support column)
55 first fixing portion
57 output-stage side ring gear
57A second ring gear
57B third ring gear
58 second fixing portion
121 crawler body (vehicle body)
122 drive wheel 501 inner tubular wall (tubular wall)
502 bottom wall
O rotational axis

What is claimed is:

1. A speed reducer comprising:
a multi-stage reduction unit for decelerating a rotational driving force of an electric motor from an input stage toward an output stage and transmitting the decelerated rotational driving force to a rotational drive unit,
wherein the multi-stage reduction unit includes:
 a front-stage reduction unit disposed at the input stage, the front-stage reduction unit including a first gear;
 a first ring gear meshed with the first gear; and
 a final-stage reduction unit disposed at the output stage, the final-stage reduction unit including a final-stage carrier having an inner space formed therein, and
wherein the first ring gear is disposed in the inner space of the final-stage carrier.

2. The speed reducer of claim 1,
wherein the multi-stage reduction unit includes a middle-stage reduction unit interposed between the front-stage reduction unit and the final-stage reduction unit, and
wherein the middle-stage reduction unit decelerates the rotational driving force input from the front-stage reduction unit and transmits the decelerated rotational driving force to the final-stage reduction unit.

3. The speed reducer of claim 2,
wherein the multi-stage reduction unit includes:
 a second ring gear meshed with a second gear of the middle-stage reduction unit; and
 a third ring gear meshed with a third gear of the final-stage reduction unit, and
wherein the second ring gear and the third ring gear are not allowed to rotate relative to each other.

4. The speed reducer of claim 2,
wherein the middle-stage reduction unit includes a second gear and a middle-stage carrier rotatably supporting the second gear,
wherein the final-stage reduction unit includes a sun gear and a third gear meshing with the sun gear,
wherein the middle-stage carrier is integrated with the sun gear, and
wherein the middle-stage carrier and the sun gear are penetrated by an input shaft disposed coaxially with a rotational axis of the electric motor.

5. The speed reducer of claim 4,
wherein the final-stage carrier has a bottomed tubular shape with a tubular wall and a bottom wall,
wherein the first gear is disposed to mesh with an inner peripheral surface of the tubular wall,
wherein the multi-stage reduction unit includes a third ring gear meshed with the third gear, and
wherein the bottom wall is provided with:
 a bearing rotatably supporting the input shaft; and
 a support column supported so as not to be able to revolve relative to the sun gear and rotatably supporting the third gear.

6. A speed reducer comprising:
a multi-stage reduction unit for decelerating a rotational driving force of an electric motor from an input stage toward an output stage and transmitting the decelerated rotational driving force to a rotational drive unit,
wherein the multi-stage reduction unit includes:
 a front-stage reduction unit disposed at the input stage;
 a final-stage reduction unit disposed at the output stage, the final-stage reduction unit including a final-stage carrier having an inner space formed therein;
 a middle-stage reduction unit interposed between the front-stage reduction unit and the final-stage reduction unit and configured to decelerate the rotational driving force input from the front-stage reduction unit and transmit the decelerated rotational driving force to the final-stage reduction unit;
 a first ring gear meshed with a first gear of the front-stage reduction unit;
 a second ring gear meshed with a second gear of the middle-stage reduction unit; and
 a third ring gear meshed with a third gear of the final-stage reduction unit and disposed on the second ring gear so as not to be rotatable relative to the second ring gear,
wherein the first ring gear is disposed in the inner space of the final-stage carrier,
wherein the final-stage reduction unit includes a sun gear,
wherein the middle-stage reduction unit includes a middle-stage carrier integrated with the sun gear and rotatably supporting the second gear,
wherein the middle-stage carrier and the sun gear are penetrated by an input shaft disposed coaxially with a rotational axis of the electric motor,
wherein the final-stage carrier has a bottomed tubular shape with a tubular wall and a bottom wall,
wherein the first gear is disposed to mesh with an inner peripheral surface of the tubular wall, and
wherein the bottom wall is provided with:
 a bearing rotatably supporting the input shaft; and
 a support column supported so as not to be able to revolve relative to the sun gear and rotatably supporting the third gear.

7. A construction machine comprising:
a vehicle body;
a drive wheel for traveling of the vehicle body; and
an electric motor and a speed reducer for driving the drive wheel,
wherein the speed reducer includes a multi-stage reduction unit for decelerating a rotational driving force of an electric motor from an input stage toward an output stage and transmitting the decelerated rotational driving force to a rotational drive unit,
wherein the multi-stage reduction unit includes:
 a front-stage reduction unit disposed at the input stage, the front-stage reduction unit including a first gear;
 a first ring gear meshed with the first gear;
 a final-stage reduction unit disposed at the output stage, the final-stage reduction unit including a final-stage carrier having an inner space formed therein; and
 a second ring gear meshing with the final-stage reduction unit,
wherein the first ring gear is disposed in the inner space of the final-stage carrier and fixed to the vehicle body,
wherein the second ring gear is fixed to the drive wheel, and
wherein the speed reducer transmits the rotational driving force of the electric motor to the drive wheel.

8. The speed reducer of claim 3,
wherein the middle-stage reduction unit includes a middle-stage carrier rotatably supporting the second gear,
wherein the final-stage reduction unit includes a sun gear meshing with the third gear,
wherein the middle-stage carrier is integrated with the sun gear, and wherein the middle-stage carrier and the sun gear are penetrated by an input shaft disposed coaxially with a rotational axis of the electric motor.

* * * * *